United States Patent
DeLuca et al.

(10) Patent No.: US 11,348,062 B2
(45) Date of Patent: May 31, 2022

(54) E-COMMERCE DELIVERY ADDRESS UPON CHECKOUT BASED ON TRUSTED CONTACTS AND ESTIMATED DELIVERY TIMES

(71) Applicant: INTERNATIONAL BUSINESS MACHINES CORPORATION, Armonk, NY (US)

(72) Inventors: Lisa Seacat DeLuca, Baltimore, MD (US); Hemant Kumar Sivaswamy, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 16/692,019

(22) Filed: Nov. 22, 2019

(65) Prior Publication Data
US 2021/0158289 A1    May 27, 2021

(51) Int. Cl.
*G06Q 10/08*    (2012.01)
*H04W 4/35*    (2018.01)
(Continued)

(52) U.S. Cl.
CPC ... *G06Q 10/08355* (2013.01); *G06Q 10/0833* (2013.01); *G06Q 30/0631* (2013.01); *H04W 4/029* (2018.02); *H04W 4/35* (2018.02)

(58) Field of Classification Search
CPC ......... G06Q 10/08355; G06Q 10/0833; G06Q 30/0631; H04W 4/35; H04W 4/029; H04L 67/306
See application file for complete search history.

(56) References Cited

U.S. PATENT DOCUMENTS 3,353,845 A * 11/1967 Curran ................ G09F 3/0288
                                                                462/56
5,831,860 A * 11/1998 Foladare ............... G06Q 10/08
                                                                700/219
(Continued)

FOREIGN PATENT DOCUMENTS

JP    2005255306 A    9/2005

OTHER PUBLICATIONS

Risley, James. "No porch piracy: New package delivery alternatives". Retrieved from <https://www.digitalcommerce360.com/2018/10/17/delivery-options-abound-ahead-of-holiday-shopping-season/> on Oct. 15, 2021. Originally published Oct. 2018. (Year: 2018 ).*

(Continued)

*Primary Examiner* — Nathan A Mitchell
(74) *Attorney, Agent, or Firm* — Conley Rose, P.C.

(57) ABSTRACT

A computer-implemented method for providing delivery recommendation options for an E-commerce transaction. The method includes obtaining delivery data of previous orders purchased by a user from a plurality of E-commerce retailers. The method updates a user delivery profile of the user based on the delivery data of the previous orders purchased by the user from the plurality of E-commerce retailers. The method provides delivery recommendation options to the user during a checkout process of an order associated with the plurality of E-commerce retailers based on the user delivery profile and an estimated scheduled delivery. The delivery recommendation options include one or more trusted contacts of the user. The method receives a selection of a trusted contact from the delivery recommendation options. The method generates a shipping label addressed to the trusted contact. The shipping label includes an indication that the package is intended for the user.

20 Claims, 8 Drawing Sheets

(51) Int. Cl.
*H04W 4/029* (2018.01)
*G06Q 30/06* (2012.01)

(56) References Cited

U.S. PATENT DOCUMENTS

| | | | |
|---|---|---|---|
| 8,015,023 B1* | 9/2011 | Lee | G06Q 10/063114 705/1.1 |
| 9,313,151 B1 | 4/2016 | Wheeler | |
| 9,350,599 B1* | 5/2016 | Enright | G06Q 10/10 |
| 10,147,068 B2 | 12/2018 | Waller et al. | |
| 10,198,707 B1* | 2/2019 | Bolton | G06Q 10/0837 |
| 2003/0208414 A1 | 11/2003 | Estes | |
| 2005/0038758 A1* | 2/2005 | Hilbush | G06Q 10/06311 705/402 |
| 2009/0119194 A1* | 5/2009 | Chau | G06Q 30/06 705/35 |
| 2012/0136936 A1* | 5/2012 | Quintuna | G06F 21/6245 709/204 |
| 2012/0173448 A1* | 7/2012 | Rademaker | G06Q 50/28 705/338 |
| 2013/0006739 A1* | 1/2013 | Horvitz | G06Q 30/06 705/14.23 |
| 2013/0066744 A1 | 3/2013 | Higgins et al. | |
| 2014/0180959 A1* | 6/2014 | Gillen | G06Q 10/0833 705/341 |
| 2014/0279668 A1* | 9/2014 | Lievens | G06Q 10/087 705/340 |
| 2015/0046365 A1 | 2/2015 | Zamer | |
| 2015/0120015 A1 | 4/2015 | Fadell et al. | |
| 2015/0262125 A1* | 9/2015 | Sager | B07C 3/00 705/338 |
| 2015/0294262 A1 | 10/2015 | Nelson | |
| 2015/0324733 A1* | 11/2015 | Goodall | G06Q 10/08 705/330 |
| 2016/0350711 A1 | 12/2016 | Tsao | |
| 2017/0109805 A1 | 4/2017 | Eisen | |
| 2017/0352004 A1 | 12/2017 | McHale et al. | |
| 2018/0089411 A1 | 3/2018 | Chakraborty | |
| 2018/0204178 A1* | 7/2018 | Arshad | H04W 4/025 |
| 2018/0349844 A1* | 12/2018 | Bounasser | G06Q 10/08355 |
| 2019/0061939 A1 | 2/2019 | Anand | |
| 2019/0205832 A1* | 7/2019 | Henderson, II | G06Q 10/0832 |
| 2019/0333130 A1* | 10/2019 | Jha | G06F 16/9024 |
| 2020/0327491 A1* | 10/2020 | Nishikawa | G01C 21/265 |

OTHER PUBLICATIONS

Anonymously, "Method and System for Detecting a Real-Time Occupancy Status of a Delivery Recipient," IP.com, IPCOM000257571D, Feb. 19, 2019, 4 pages.

Singh, "Amazon India Expands Pickup Centres From 20 to 800+ Across 45 Cities," https://inc42.com/buzz/amazon-india-plans-to-open-800-pickup-centers-across-45-cities/, Apr. 27, 2015, 7 pages.

"Small Shops to Become Ecommerce Pick-up and Drop-off Points!," IndianOnlineSeller.com, https://indianonlineseller.com/2015/02/small-shops-to-become-ecommerce-pick-up-and-d . . . , 2015, 6 pages.

Benday, "Dyanmic Delivery: Changing the Rules of Retail," https:www.campaignlive.co.uk/article/dynamic-delivery-changing-rules-retail/1208897, Aug. 30, 2013, 10 pages.

List of IBM Patents or Patent Applications Treated as Related, 2 pages, Nov. 22, 2019.

Office Action dated Jul. 12, 2021, U.S. Appl. No. 16/692,015, filed Nov. 22, 2019, 30 pages.

Office Action dated Nov. 23, 2021, U.S. Appl. No. 16/692,015, filed Nov. 22, 2019, 29 pages.

* cited by examiner

E-commerce Retailer — 402    Checkout

Shipping address
Lisa Deluca
125 Main Street #3A
404 — New York City, New York

DELIVERY ALERT — 412

Change

Place Order

406
Order summary
Items: $12.99
Shipping and handling: $0.00
Total Before Tax: $12.99
Discount: $0.00
Estimated tax: $0.78
Order total: $13.77

Smart delivery address We recommend you deliver to a trusted friend based on the estimated delivery date/time 410
Bob Jones
125 Main Street #3B   Select Bob
New York City, New York Jane Doe
125 Main Street #3C   Select Jane
New York City, New York Payment method    Credit Card Number
408
Exp. Date    Security Code Review items and shipping

E-COMMERCE DELIVERY ADDRESS UPON CHECKOUT BASED ON TRUSTED CONTACTS AND ESTIMATED DELIVERY TIMES

BACKGROUND

Electronic commerce (Ecommerce or E-commerce) refers to commercial transactions conducted online using the Internet. Merchants or businesses that sell goods or services are called online retailers. Online retailers maintain a website or E-commerce site that enables consumers to browse and purchase goods or services offered by the retailer, and have the goods delivered either directly to the customer's address or to a dedicated pick up point such as a store and/or a mail or shipping-center.

SUMMARY

Aspects of the disclosed embodiments include a computer-implemented method for providing delivery recommendation options for an E-commerce transaction. The method includes obtaining delivery data of previous orders purchased by a user from a plurality of E-commerce retailers. The method updates a user delivery profile of the user based on the delivery data of the previous orders purchased by the user from the plurality of E-commerce retailers. The method provides delivery recommendation options to the user during a checkout process of an order associated with the plurality of E-commerce retailers based on the user delivery profile and an estimated scheduled delivery. The delivery recommendation options include one or more trusted contacts of the user. The method receives a selection of a trusted contact from the delivery recommendation options. The method generates a shipping label addressed to the trusted contact. The shipping includes an indication that the package is intended for the user.

In various implementations, the method provides a delivery alert notification in response to a determination that the user is not likely to be available to receive the package during the estimated scheduled delivery. In various implementations, the delivery data of the previous orders purchased by the user comprises missed deliveries and successful deliveries, and corresponding delivery addresses, delivery days of the week, and delivery time of the day for the missed deliveries and the successful deliveries. In various implementations, the method identifies the trusted contacts of the users based on social media accounts associated with the user. In various implementations, the one or more trusted contacts of the user are manually added by the user. In various implementations, the method obtains real-time location information of the user and/or a trusted contact, and updates the user delivery profile of the user using the real-time location information of the user and/or the trusted contact.

Other aspects, implementations, and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that, although an illustrative implementation of one or more embodiments are provided below, the disclosed systems, computer program product, and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

When a user purchases an item from an E-commerce site, the user generally enters a shipping address during the checkout process or selects from a previously entered shipping address that is most convenient or where a package is most likely to be received safely based on his/her own personal judgment or experience. Often times, the user is not available at the selected delivery address when the package arrives. This can result in delay, lost/stolen packages, and other inconveniences to the user, merchant, and delivery service company. Therefore, it would be beneficial if the E-commerce site provided some guidance or suggestions on delivery locations based on prior delivery tracking data such as, but not limited to, historical availability of a package recipient, estimated delivery date/time, and relationships with trusted nearby users of the system. Accordingly, disclosed herein are various embodiments of systems and methods for recommending one or more delivery addresses for the checkout process of an E-commerce transaction.

Figure 1:
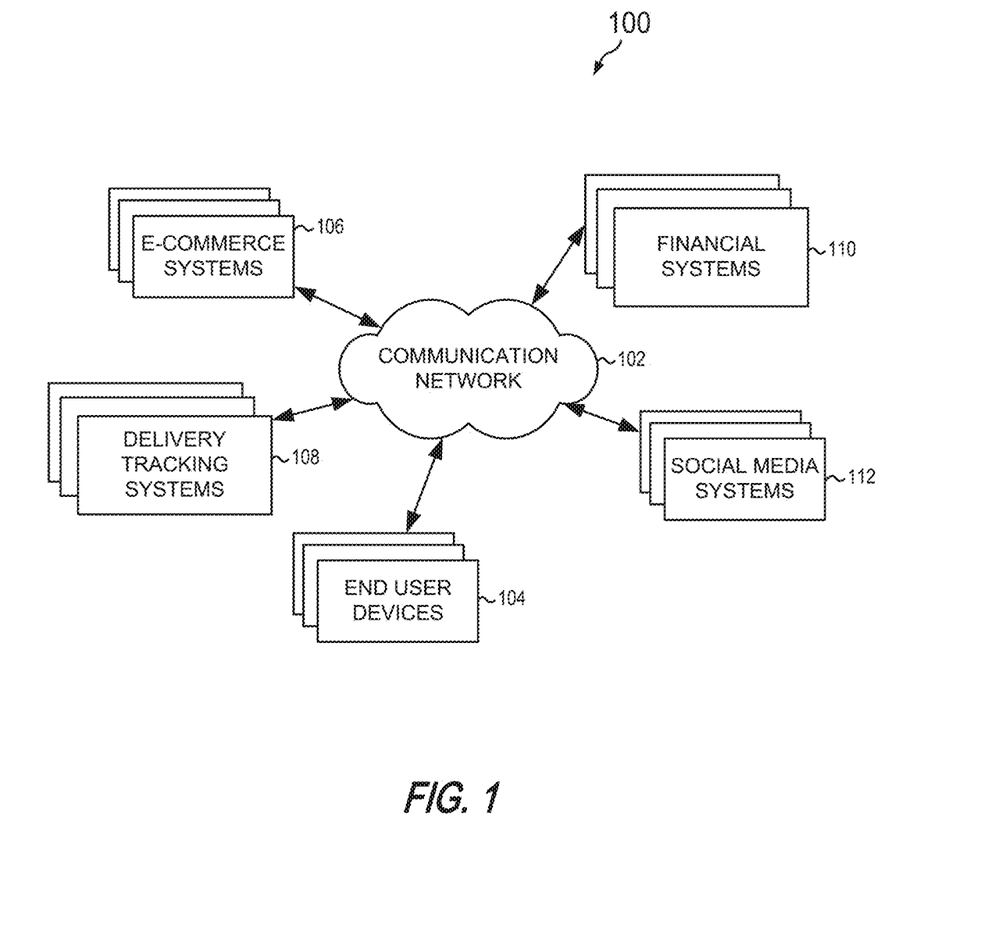
FIG. 1 is a schematic diagram illustrating a network in accordance with an embodiment of the present disclosure.

FIG. 1 is a schematic diagram illustrating a network 100 in accordance with an embodiment of the present disclosure. The network 100 includes a communication network 102 that enables various devices or systems to communicate with one another such as, but not limited to, end user devices 104, E-commerce systems 106, delivery tracking systems 108, financial systems 110, and social media systems 112.

The communication network 102 includes a system of electronic devices that are joined together via communication links to enable the exchanging of information and/or the sharing of resources. The communication network 102 may comprise multiple subnetworks including wired and wireless networks. For instance, non-limiting examples of networks that may be part of the communication network 102 include local-area networks (LANs), wide-area networks (WANs), and metropolitan-area networks (MANs). The networks may include one or more private networks and/or public networks such as the Internet. The various networks within the communication network 102 may employ any type of communication standards and/or protocol.

The end user devices 104 can include any number of electronic devices capable of communicating over the communication network 102. Non-limiting examples of end user devices 104 include any type of Internet-enabled device including smart phones, tablets, laptops, computers, and other types of smart devices/electronics. The E-commerce systems 106 can include servers, databases, and other types of systems that enable the functions and features of an E-commerce site. The delivery tracking systems 108 store and track delivery information related to packages containing goods purchased from the one or more E-commerce sites. The financial systems 110 enable the financial transaction for effectuating the purchase of goods and services from the one or more E-commerce sites. The social media systems 112 provide various social media services to users. Examples of social media services include Facebook®, Twitter®, Instagram®, LinkedIn®, Meetup®, and Snapchat®. In accordance with various embodiments, the social media services may be used to identify one or more trusted contacts for use as an E-commerce delivery address option during a checkout process with the one or more E-commerce sites.

Figure 2:
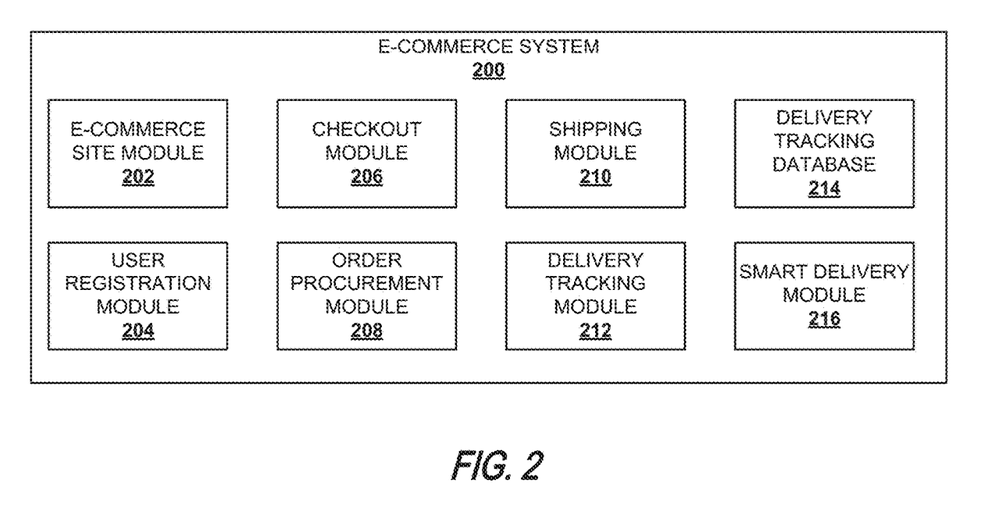
FIG. 2 is a schematic diagram illustrating an E-commerce system in accordance with an embodiment of the present disclosure.

FIG. 2 is a schematic diagram illustrating an E-commerce system 200 in accordance with an embodiment of the present disclosure. The E-commerce system 200 is an example of the E-commerce system 106 of FIG. 1. The E-commerce system 200 includes an E-commerce site module 202, a user registration module 204, a checkout module 206, an order procurement module 208, a shipping module 210, a delivery tracking module 212, a delivery tracking database 214, and a smart delivery module 216.

A module as referenced herein may comprise of software components such as, but not limited to, data access objects, service components, user interface components, application programming interface (API) components; hardware components such as electrical circuitry, processors, and memory; and/or a combination thereof. The memory may be volatile memory or non-volatile memory that stores data and computer executable instructions. The computer executable instructions may be in any form including, but not limited to, machine code, assembly code, and high-level programming code written in any programming language. The module may be configured to use the data to execute one or more instructions to perform one or more tasks.

The E-commerce site module 202 is configured to provide the user interface or website of an E-commerce retailer that can be accessed via a user device such as end user devices 104. For example, the E-commerce site module 202 can be configured to display descriptions, prices, images, and reviews of goods available from E-commerce retailer, provide features of the E-commerce site such as sorting or searching for certain goods, and enable a user to create or sign in to a user account associated with the E-commerce retailer.

For example, in an embodiment, the user registration module 204 is called when a user wants to create an account or user profile. The user registration module 204 requests certain information from the user for creating the user's account such as, but not limited to, the user's full name, address, contact information, and account username and password. A user's purchase or search history associated with the E-commerce retailer can be tied to the user's account. Payment and shipping preference information can also be requested and tied to the user's account.

The checkout module 206 is configured to perform a checkout process when a user is ready to purchase one or more goods from the E-commerce retailer. For example, the checkout module 206 can be configured to determine a total cost for the goods and initiate the shipping module 210 to determine shipping options including estimated shipping dates and corresponding costs. The checkout module 206 can also communicate with one or more financial systems, such as financial systems 110, for completing payment of the purchase order.

The order procurement module 208 can then be initiated to fulfill the purchase order. For example, the order procurement module 208 can be configured to communicate with one or more inventory databases and/or procurement systems to initiate packing and shipping of the goods to fulfill the purchase order.

The delivery tracking module 212 monitors and tracks the shipping progress of the purchase order. In an embodiment, the delivery tracking module 212 collects data on the shipping progress of each order placed by the user with the E-commerce retailer. Non-limiting examples of data collected on the shipping progress can include missed deliveries, delivery attempts, successful deliveries, corresponding delivery addresses, corresponding delivery days of the week, and corresponding delivery time of the day. In an embodiment, if the user grants data access permission, the delivery tracking module 212 may be configured to communicate with one or more databases or systems of a shipper (e.g., United Parcel Services (UPS), Federal Express (FedEx), and United States Postal Service (USPS)) for retrieving the data on the shipping progress of each order placed by the user the with E-commerce retailer and/or shipping information on all deliveries associated with a user from any number of E-commerce retailers. The E-commerce system 200 can then store the delivery tracking information on purchase orders associated with the user in the delivery tracking database 214.

In accordance with an embodiment, the E-commerce system 200 incorporates the smart delivery module 216 into the checkout process. The smart delivery module 216 is configured to utilize the delivery tracking information on purchase orders associated with the user in the delivery tracking database 214 to provide suggested delivery addresses, trusted contacts, and/or delivery dates/times during the checkout process that would provide the best option or probability of success in delivering the package to the user in a timely and safe manner (e.g., less chance of a package being stolen or delayed because the user is not home to sign for the delivery). The smart delivery module 216 can be configured to continually learn as new deliveries/ delivery tracking information are added to the system to provide the best shipping recommendation(s) to the user.

In an embodiment, the smart delivery module 216 can be configured to add trusted contacts to the system for the user. Trusted contacts can include, but are not limited to, friends, neighbors, coworkers, and relatives. The smart delivery module 216 can be configured to automatically add trusted contacts to the system for the user and/or a user may manually enter trusted contact information into the E-commerce system 200. In an embodiment, with the permission of the user, the system can be configured to connect to one or more social media accounts associated with the user (e.g., Facebook®, LinkedIn®, and Nextdoor®) to extract or identify trusted contacts from the one or more social media accounts associated with the user. For example, in one embodiment, the smart delivery module 216 can identify suggested contacts that have a 1st degree connection to the user (i.e., a direct relationship) and have addresses that are conveniently located to the user. The user can then select from suggested trusted contacts to include in the smart delivery module 216. A trusted contact may also be identified or selected from a directory system or database entry such as, but not limited to, a neighborhood or school directory. In an embodiment, a notification is sent to the trusted contact to request consent from the trusted contact to be used as a trusted contact for package deliveries for the user. In some embodiments, sensor data can be used to determine presence of the user and any trusted contact that opts-in to share their location information. Non-limiting techniques that may be used to determine the schedule and presence of the user and trusted contacts can include global positioning system (GPS) coordinates of a user's or trusted contact's user device (e.g., smartphone), location information of vehicles, motion activity (e.g., using a user's security camera doorbell with motion sensor data), and Wi-Fi® or cellular data activity.

In an embodiment, if the user selects a trusted contact suggested by the smart delivery module 216, a special shipping label can be generated that reflects that a delivery/package that is addressed to a trusted contact is intended for the user. In an embodiment, the trusted contact can be notified (e.g., via email or text message) that a package intended for the user is being shipped to the trusted contact. Additionally, any tracking information associated with the delivery can be shared amongst all parties.

Figure 3:
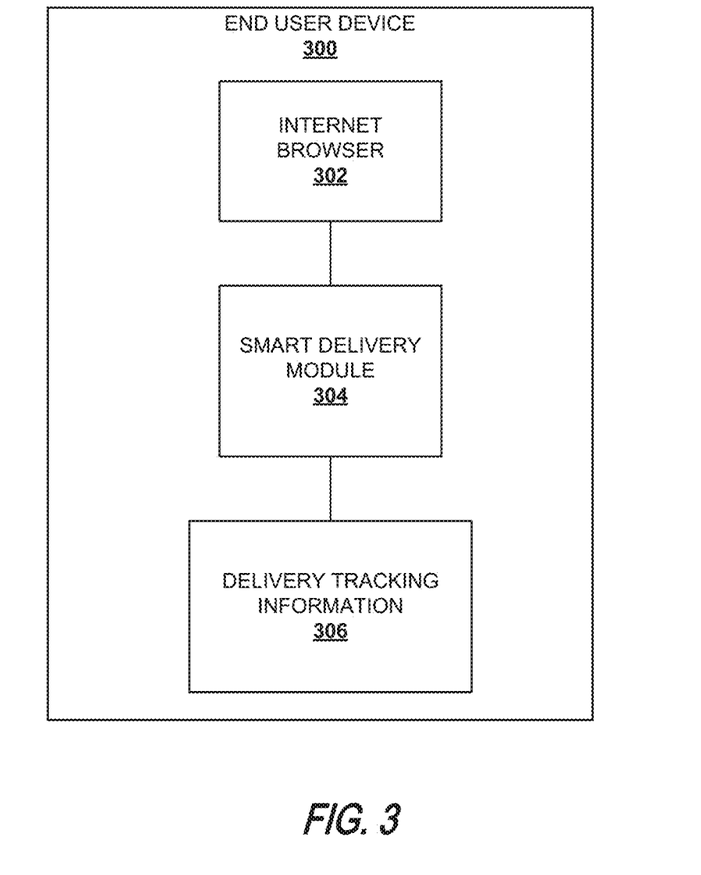
FIG. 3 illustrates a smart delivery module executed on an end user device in accordance with an embodiment of the present disclosure.

FIG. 3 illustrates an embodiment of a smart delivery module that is executed on an end user device 300 for incorporating the smart delivery options into the checkout process of one or more E-commerce retailers. The end user device 300 is an example of the end user device 104 of FIG. 1. For example, the end user device 300 can include an internet browser 302 that provides an interface for accessing content on the Internet. In an embodiment, a smart delivery module 304 can be installed as a browser extension or add-on to the internet browser 302, or as a separate application on the end user device 300 that monitors for transactions occurring on one or more E-commerce retailer sites. The smart delivery module 304 can be configured to perform similar functions as the smart delivery module 216. For example, the smart delivery module 304 can be initiated when a user enters a checkout process on one or more E-commerce retailer sites to provide the user with recommended smart delivery options based on stored delivery tracking information 306 associated with the user and/or one or more trusted contacts.

Figure 4:
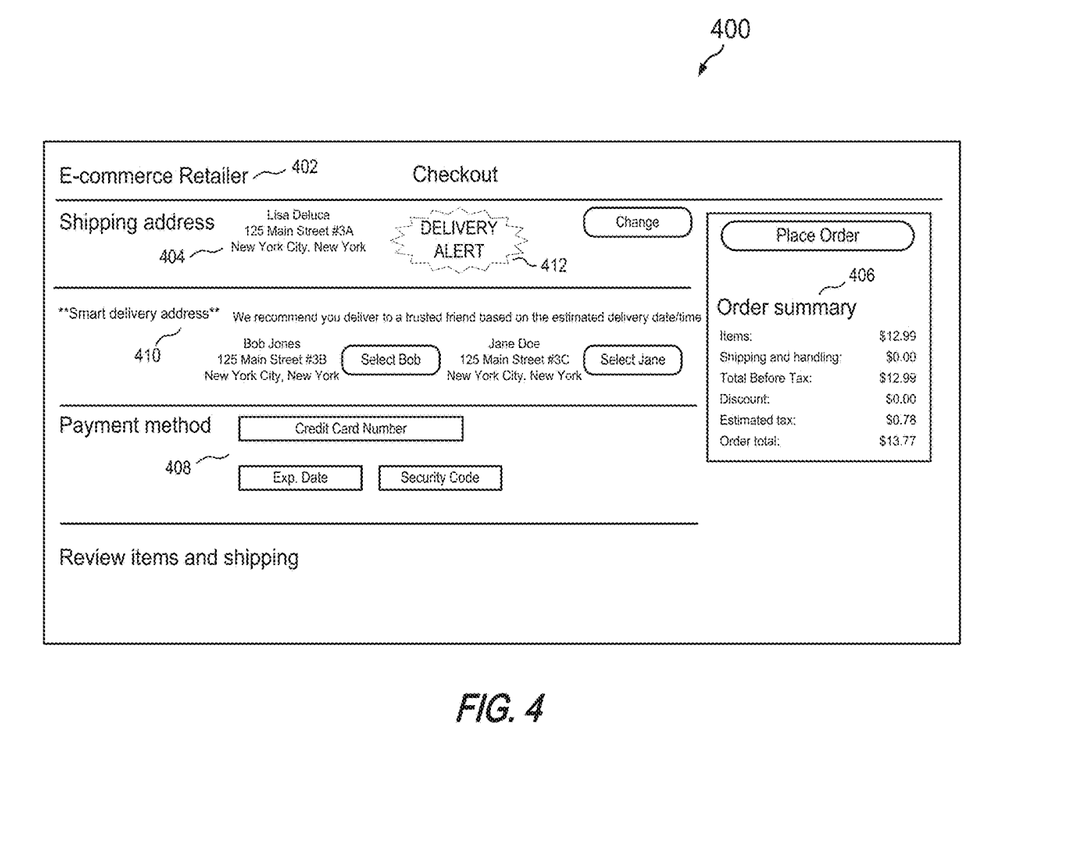
FIG. 4 illustrates user interface that is displayed to the user during a checkout process of an E-commerce retailer in accordance with an embodiment of the present disclosure.

FIG. 4 illustrates a user interface 400 that can be displayed on an end user device 104 during the checkout process of an E-commerce retailer 402 in accordance with one example of the present disclosure. The user interface 400 includes a default shipping address 404 associated with the user account, which can be changed if necessary by the user. The user interface 400 provides an order summary 406 that displays the cost of items associated with the user's order. The user interface 400 also includes the typical payment fields 408 such as credit card number, expiration date, and credit card security code.

In accordance with the disclosed embodiments, the user interface 400 provides the user with one or more recommended or smart delivery options 410 based on stored delivery tracking information associated with the user and/or one or more trusted contacts. In an embodiment, the smart delivery options 410 may be presented in an order based on a ranking that predicts the best delivery options for the user. In some embodiments, artificial intelligence (AI) models and/or machine learning techniques may be employed to determine the suggested smart options for the user. For example, trusted contacts can be prioritized based on one or more factors such as, but not limited to, location/distance from the user home/work address, relationship to the user (e.g., friend, boyfriend, neighbor, coworker, etc.), reliability, whether the trusted contact has previously selected the user as a trusted contact for deliveries, rating (e.g., from other trusted contacts, neighbors), whether the trusted contact has a relationship with someone the user knows (e.g., friends of friends), etc. Each of these factors may be automatically weighted by the AI model or be weighted according to a user's preference. For example, a user may prioritize location and give distance/location the highest weight (e.g., 0.75 weight), reliability (0.1 weight), and so forth. Another user may prioritize selecting trusted contacts that the user has a closer relationship with and give relationship the highest weight. Still, another user may prefer to select trusted contacts that the user is also a trusted contact of so as to not inconvenience others. Based on these preferences, the system can provide the user with the best or prioritized list of trusted contacts during the checkout process. In an embodiment, the suggested trusted contact recommendation can include a reason as to why the trusted contact is recommended (e.g., Based on the estimated delivery date and time, Bob Jones is typically home at 3 pm on Wednesdays).

In an embodiment, the user interface 400 can also provide a delivery alert notification 412 if the smart delivery module determines that the user is typically not available to accept deliveries on the estimated delivery date and time, so as to alert the user to select a smart delivery option 410 instead of having the delivery sent directly to the user. In an embodiment, the smart delivery module can be configured to monitor for any delay in shipment (e.g., an item is being restocked) and if the estimated delivery date/time changes, the smart delivery module can provide the user with a message (e.g., email, text message, or an application notification) indicating the delay and may provide updated recommended delivery options to the user based on the new estimated delivery date/time.

Figure 5:
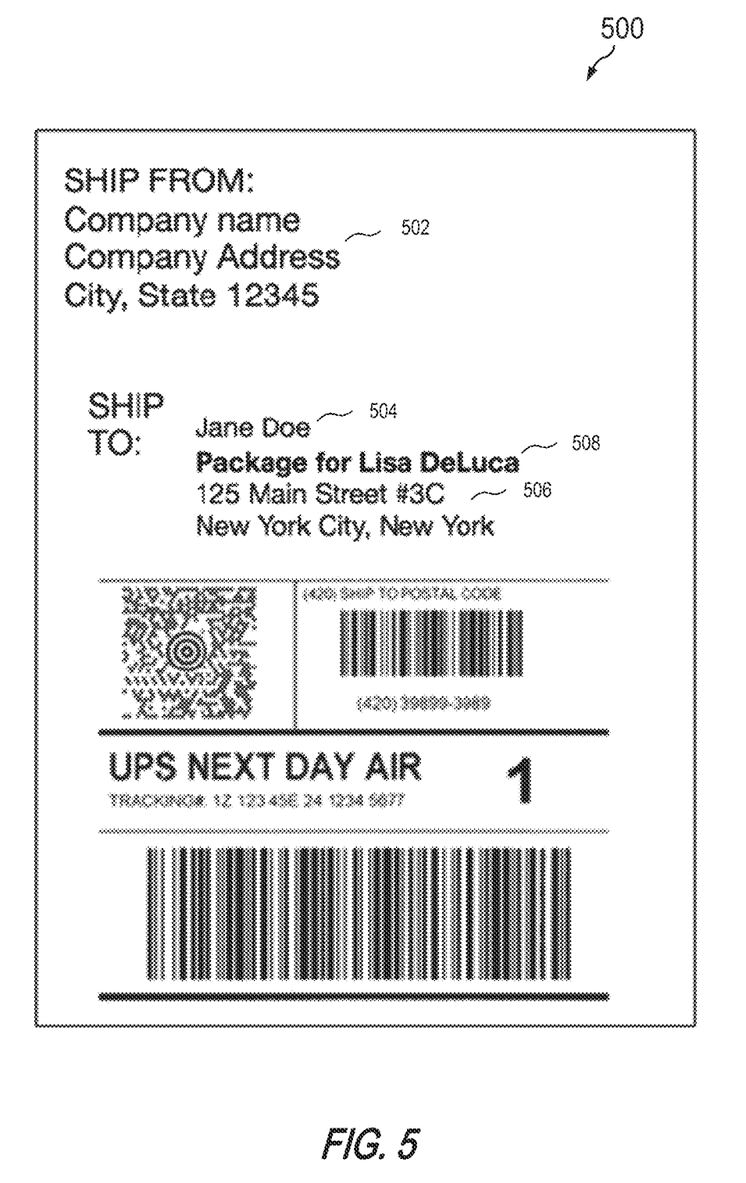
FIG. 5 illustrates a shipping label in accordance with an embodiment of the present disclosure.

FIG. 5 illustrates a shipping label 500 that is created when the smart delivery option 410 is used in accordance with an embodiment of the present disclosure. The shipping label 500 includes the standard information found on current shipping labels such as the sender name and address 502, and the recipient name 504 and address 506. The shipping label 500 could also include one or more barcodes or Quick Response (QR) Codes that can be used to track the delivery status of the package. In accordance with the disclosed embodiments, the shipping label 500 includes a notification or indication 508 that the package is intended for a particular person that is different from the recipient name 504 to provide notice to the recipient 504 that the contents of the package is not for him/her.

As an example, Lisa works really late in the office. She's had a number of packages stolen recently. She's tried delivering to her work address, but has been informed that personal packages should not be delivered to work. Using the disclosed embodiments, the system would determine based on the estimated delivery date and time that Lisa tends to not be present for delivery based on historical delivery information. The system can then use shared data about neighbors and trusted contacts to determine a confidence of a trusted neighbor being home during the delivery window. In this case, both Bob and Jane are friends with Lisa and are likely going to be home during the estimated delivery time. Thus, during the E-commerce checkout process, Bob and Jane are recommended as trusted contacts that are able to receive the delivery.

If Lisa selects Jane, then the package would be printed with Jane's address and include details that the package is intended for Lisa so that Jane doesn't open it thinking that the package is hers. Tracking information could be shared with both users.

Figure 6:
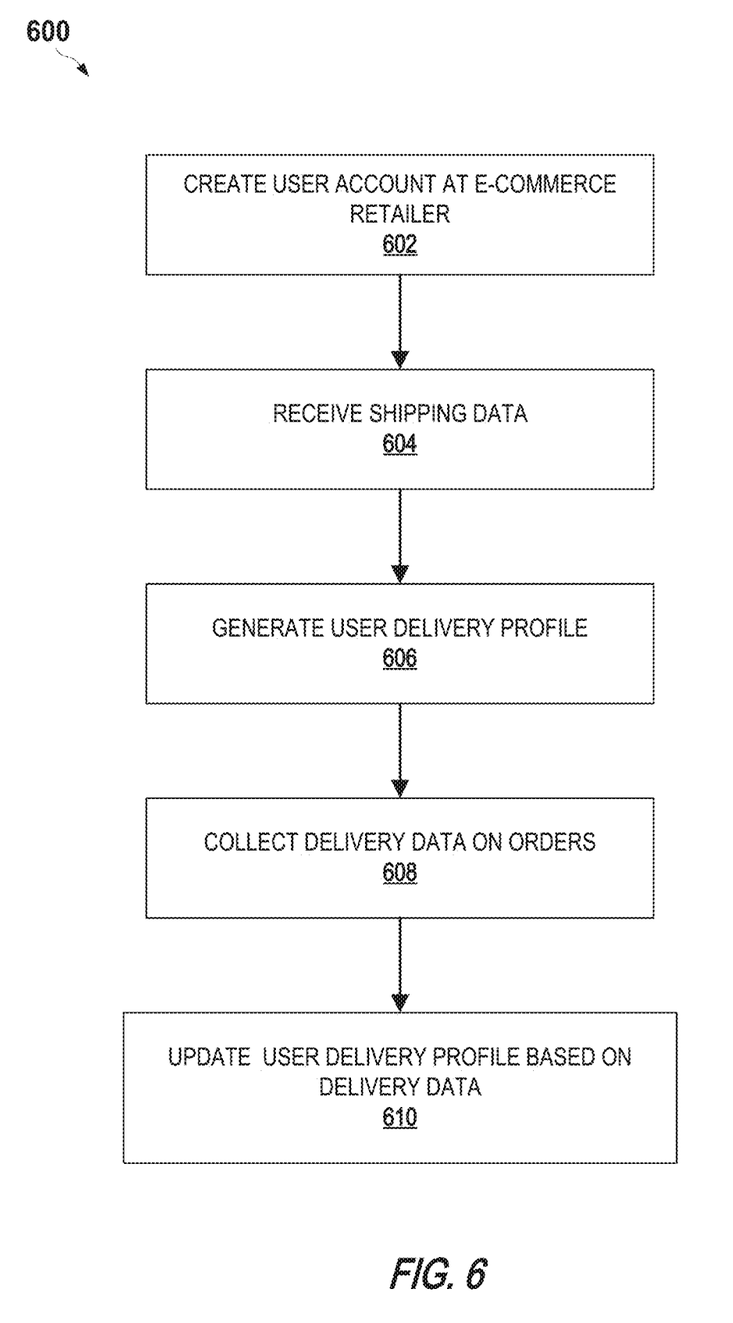
FIG. 6 is a flowchart illustrating a method for creating a user delivery profile in accordance with an embodiment of the present disclosure.

FIG. 6 is a flowchart illustrating a method 600 for creating a user delivery profile in accordance with an embodiment of the present disclosure. The method 600 may be performed by an E-commerce system 106, an end user device 104, or some other third party system that communicates with the commerce system 106 and/or the end user device 104 of FIG. 1. The method 600 begins at step 602 by creating a user account associated with an E-commerce retailer. The method 600 at step 604 receives shipping data associated with the user. The shipping data can include the user's primary address, work address, days of the week and times that the user is typically at home or at work, names and addresses of one or more trusted contacts (and/or permission to mine for trusted contacts on the user's social media accounts). At step 606, the method 600 generates a user delivery profile for the user based on the shipping data associated with the user. The method 600 at step 608 collects delivery data on orders placed by the user at one or more E-commerce retailer site. The method 600 at step 610 updates the user delivery profile based on the collected delivery data. For example, a particular trusted contact may be removed as a recommended delivery option if the trusted contact has not been available for deliveries for a predetermined number of times within a specified time period (e.g., trusted contact can be removed if there is three missed deliveries within one month).

Figure 7:
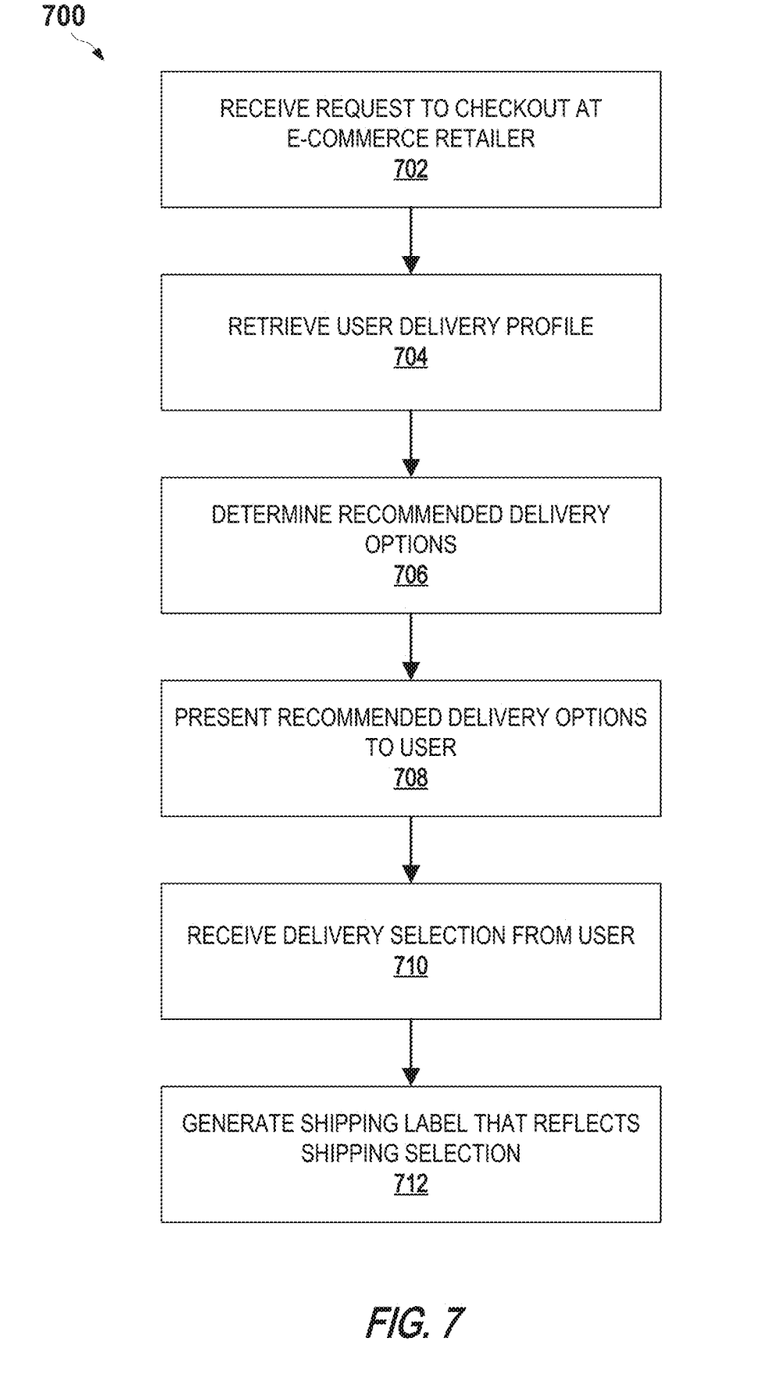
FIG. 7 is a flowchart illustrating a method of a checkout process in accordance with an embodiment of the present disclosure.

FIG. 7 is a flowchart illustrating a method 700 of a checkout process in accordance with an embodiment of the present disclosure. The method 700 may be performed by an E-commerce system 106, an end user device 104, or some other third party system that communicates with the commerce system 106 and/or the end user device 104 of FIG. 1. The method 700 begins at step 702 by receiving a request to checkout (i.e., pay for an order) at an ecommerce retailer. The method 700 at step 704 retrieves a user delivery profile associated with the user. At step 706, the method 700 determines recommended delivery options based on user delivery profile and an estimated delivery time window. The method 700 at step 708 presents the recommended delivery options to the user. For example, the method 700 may indicate that the recommended delivery option is to deliver the package directly to the user or, if the method 700 determines that the user is generally not available during the estimated delivery window, provide a recommendation to have the package delivered to a particular trusted contact of the user based on the estimated delivery window and the delivery data associated with the trusted contact.

At step 710, the method 700 receives a delivery selection from the user indicating who/where to deliver the order. The method 700 at step 712 generates a shipping label that reflects shipping selection such as the shipping label 500 in FIG. 5. The package is then shipped and the delivery information of the package is tracked, and is used to update the user delivery profile as necessary for future orders.

Figure 8:
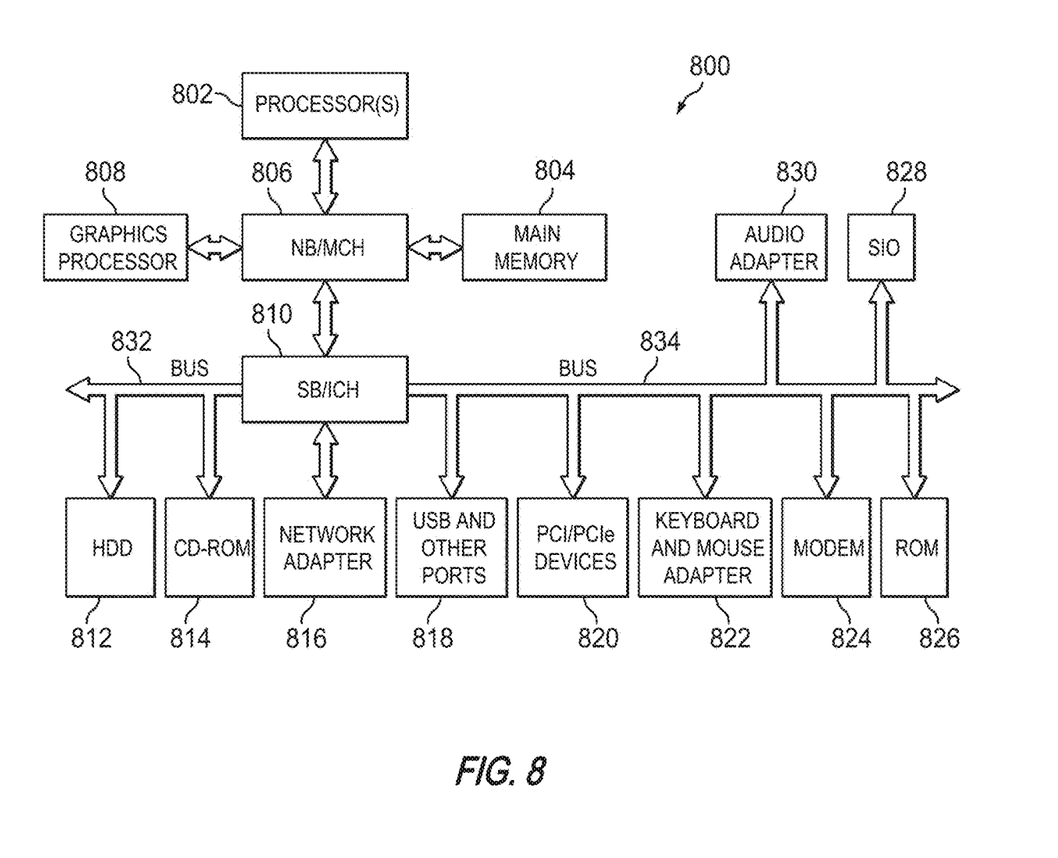
FIG. 8 is a block diagram of a system in which various embodiments of the present disclosure may be implemented.

FIG. 8 is a block diagram of a system 800 in which various embodiments of the present disclosure may be implemented. For example, in one embodiment, the E-commerce system 200 of FIG. 2 or an end user device 104 of FIG. 1 can be implemented using the system 800. Alternatively, the system 800 may represent a network device such as a server in which a smart delivery module may be implemented and executed. The system 800 is just one embodiment for implementing the disclosed embodiments and is not intended to limit the disclosure or the claims. For instance, the disclosed embodiments may be implemented in various system configurations that may not include all the hardware components depicted in FIG. 8. Similarly, the disclosed embodiments may be implemented in various system configurations that may include additional hardware components that are not depicted in FIG. 8.

In the depicted example, the system 800 employs a hub architecture including north bridge and memory controller hub (NB/MCH) 806 and south bridge and input/output (I/O) controller hub (SB/ICH) 810. Processor(s) 802, main memory 804, and graphics processor 808 are connected to NB/MCH 806. Graphics processor 808 may be connected to NB/MCH 806 through an accelerated graphics port (AGP). A computer bus, such as bus 832 or bus 834, may be implemented using any type of communication fabric or architecture that provides for a transfer of data between different components or devices attached to the fabric or architecture.

In the depicted example, network adapter 816 connects to SB/ICH 810. Audio adapter 830, keyboard and mouse adapter 822, modem 824, read-only memory (ROM) 826, hard disk drive (HDD) 812, compact disk read-only memory (CD-ROM) drive 814, universal serial bus (USB) ports and other communication ports 818, and peripheral component interconnect/peripheral component interconnect express (PCI/PCIe) devices 820 connect to SB/ICH 810 through bus 832 and bus 834. PCI/PCIe devices 820 may include, for example, Ethernet adapters, add-in cards, and personal computer (PC) cards for notebook computers. PCI uses a card bus controller, while PCIe does not. ROM 826 may be, for example, a flash basic input/output system (BIOS). Modem 824 or network adapter 816 may be used to transmit and receive data over a network.

HDD 812 and CD-ROM drive 814 connect to SB/ICH 810 through bus 834. HDD 812 and CD-ROM drive 814 may use, for example, an integrated drive electronics (IDE) or serial advanced technology attachment (SATA) interface. Super I/O (SIO) device 828 may be connected to SB/ICH 810. In some embodiments, HDD 812 may be replaced by other forms of data storage devices including, but not limited to, solid-state drives (SSDs).

An operating system runs on processor(s) 802. The operating system coordinates and provides control of various components within the system 800 in FIG. 8. Various applications and services may run in conjunction with the operating system such as those described herein.

The system 800 may include a single processor 802 or may include a plurality of processors 802. Additionally, processor(s) 802 may have multiple cores. For example, in one embodiment, system 800 may employ a large number of processors 802 that include hundreds or thousands of processor cores. In some embodiments, the processors 802 may be configured to perform a set of coordinated computations in parallel.

Instructions for the operating system, applications, and other data are located on storage devices, such as one or more HDD 812, and may be loaded into main memory 804 for execution by processor(s) 802. For example, in various embodiments, HDD 812 may store one or more content items, learner profiles, and computer executable instructions for generating selectable control items for a learner as disclosed herein. In some embodiments, additional instructions or data may be stored on one or more external devices. The processes for illustrative embodiments of the disclosed embodiments may be performed by processor(s) 802 using computer usable program code, which may be located in a memory such as, for example, main memory 804, ROM 826, or in one or more peripheral devices 812 and 814.

Accordingly, disclosed herein are various embodiments of systems and methods for recommending one or more delivery addresses or contacts during the checkout process of an E-commerce transaction. The benefits of the disclosed embodiments includes added convenience for customer, lower shipping costs (reduces re-deliveries), and increases return on investment of both seller and customer.

The disclosed embodiments can be implemented as a system, as a computer implemented method, and/or as a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer-implemented method for providing delivery recommendation options for an E-commerce transaction, the computer-implemented method comprising:
    obtaining delivery data of previous orders purchased by a user from a plurality of E-commerce retailers;
    obtaining permission to track a location of the user based on one or more user devices of the user;
    tracking the location of the user by obtaining Global Positioning System (GPS) data, WI-FI activity, and cellular activity of the one or more user devices of the user over a period of time to generate location information in response to obtaining the permission to track the location of the user;
    determining a schedule of the user based on the location information;
    updating a user delivery profile of the user based on the delivery data and the schedule of the user;
    determining an estimated scheduled delivery of an order during a checkout process of the order associated with the plurality of E-commerce retailers;
    determining a probability of success in delivering the order to the user based on the estimated scheduled delivery and the user profile, wherein success is based on the user being available to accept the order if delivered on the estimated scheduled delivery;
    providing delivery recommendation options to the user during a checkout process of an order associated with the plurality of E-commerce retailers when the probability of success in delivering the order is below a threshold, wherein the delivery recommendation options include one or more trusted contacts of the user; and
    receiving a selection from the delivery recommendation options selecting a trusted contact among the one or more trusted contacts of the user.

2. The method of claim 1, further comprising generating a shipping label for a package containing the order, the shipping label addressed to a name and an address associated with the trusted contact, the shipping label further comprising an indication that the package is intended for the user.

3. The method of claim 2, further comprising providing a delivery alert notification in response to a determination that the user is not likely to be available to receive the package during the estimated scheduled delivery.

4. The method of claim 1, wherein the delivery data of the previous orders purchased by the user comprises missed deliveries and successful deliveries, and corresponding delivery addresses, delivery days of a week, and delivery time of the day for the missed deliveries and the successful deliveries.

5. The method of claim 1, further comprising identifying the one or more trusted contacts of the users based on at least one of a social media account associated with the user, manual addition of the trusted contact by the user, and from a directory system entry.

6. The method of claim 1, further comprising prioritizing the one or more trusted contacts based on a plurality of weighted factors comprising a distance between the one or more trusted contacts and the user, a relationship between the one or more trusted contacts and the user, and a reliability of the one or more trusted contacts.

7. The method of claim 1, further comprising:
    obtaining permission from the one or more trusted contacts to track the location of the one or more trusted contacts;
    tracking the location of the one or more trusted contacts by obtaining the Global Positioning System (GPS) data, the WI-FI activity, and the cellular activity of one or more trusted contact user devices of the one or more trusted contacts to generate trusted contact location information;
    determining a trusted contact schedule of the one or more trusted contacts based on the trusted contact location information; and
    updating the user delivery profile of the user with the trusted contact schedule of the one or more trusted contacts.

8. A system configured to provide delivery recommendation options for an E-commerce transaction, the system comprising a processor configured to execute instructions to:
    obtain delivery data of previous orders purchased by a user from a plurality of E-commerce retailers;
    obtain permission to track a location of the user based on one or more user devices of the user;
    track the location of the user by obtaining Global Positioning System (GPS) data, WI-FI activity, and cellular activity of the one or more user devices of the user over a period of time to generate location information in response to obtaining the permission to track the location of the user;
    determine a schedule of the user based on the location information;

update a user delivery profile of the user based on the delivery data and the schedule of the user;

determine an estimated scheduled delivery of an order during a checkout process of the order associated with the plurality of E-commerce retailers;

determine a probability of success in delivering the order to the user based on the estimated scheduled delivery and the user profile, wherein success is based on the user being available to accept the order if delivered on the estimated scheduled delivery;

provide the delivery recommendation options to the user during a checkout process of an order associated with the plurality of E-commerce retailers when the probability of success in delivering the order is below a threshold, wherein the delivery recommendation options include one or more trusted contacts of the user;

receive a selection from the delivery recommendation options selecting a trusted contact among the one or more trusted contacts of the user; and generate a shipping label for a package containing the order, the shipping label addressed to a name and an address associated with the trusted contact, the shipping label further comprising an indication that the package is intended for the user.

9. The system of claim 8, further comprising instructions to provide a delivery alert notification in response to a determination that the user is not likely to be available to receive the package during the estimated scheduled delivery.

10. The system of claim 8, wherein the delivery data of the previous orders purchased by the user comprises missed deliveries and successful deliveries, and corresponding delivery addresses, delivery days of a week, and delivery time of the day for the missed deliveries and the successful deliveries.

11. The system of claim 8, further comprising instructions to identify the trusted contacts of the users based on social media accounts associated with the user.

12. The system of claim 8, further comprising instructions to prioritize the one or more trusted contacts based on a plurality of weighted factors comprising a distance between the one or more trusted contacts and the user, a relationship between the one or more trusted contacts and the user, and a reliability of the one or more trusted contacts.

13. The system of claim 12, further comprising instructions to receive weight values to apply to the plurality of weighted factors for prioritizing the one or more trusted contacts from the user.

14. The system of claim 8, further comprising instructions to:

obtain permission from the one or more trusted contacts to track the location of the one or more trusted contacts;

track the location of the one or more trusted contacts by obtaining the Global Positioning System (GPS) data, the WI-FI activity, and the cellular activity of one or more trusted contact user devices of the one or more trusted contacts to generate trusted contact location information;

determine a trusted contact schedule of the one or more trusted contacts based on the trusted contact location information; and update the user delivery profile of the user with the trusted contact schedule of the one or more trusted contacts.

15. A computer program product configured to provide delivery recommendation options for an E-commerce transaction, the computer program product comprising a computer readable storage medium having program instructions embodied therewith, the program instructions executable by a processor of a system to cause the system to:

obtain delivery data of previous orders purchased by a user from a plurality of E-commerce retailers;

obtain permission to track a location of the user based on one or more user devices of the user;

track the location of the user by obtaining Global Positioning System (GPS) data, WI-FI activity, and cellular activity of the one or more user devices of the user over a period of time to generate location information in response to obtaining the permission to track the location of the user;

determine a schedule of the user based on the location information;

update a user delivery profile of the user based on the delivery data and the schedule of the user;

determine an estimated scheduled delivery of an order during a checkout process of the order associated with the plurality of E-commerce retailers;

determine a probability of success in delivering the order to the user based on the estimated scheduled delivery and the user profile, wherein success is based on the user being available to accept the order if delivered on the estimated scheduled delivery;

provide the delivery recommendation options to the user during a checkout process of an order associated with the plurality of E-commerce retailers when the probability of success in delivering the order is below a threshold, wherein the delivery recommendation options include one or more trusted contacts of the user;

receive a selection from the delivery recommendation options selecting a trusted contact among the one or more trusted contacts of the user; and generate a shipping label for a package containing the order, the shipping label addressed to a name and an address associated with the trusted contact, the shipping label further comprising an indication that the package is intended for the user.

16. The computer program product of claim 15, further comprising program instructions executable by the processor of the system to cause the system to provide a delivery alert notification in response to a determination that the user is not likely to be available to receive the package during the estimated scheduled delivery.

17. The computer program product of claim 15, wherein the delivery data of the previous orders purchased by the user comprises missed deliveries and successful deliveries, and corresponding delivery addresses, delivery days of a week, and delivery time of the day for the missed deliveries and the successful deliveries.

18. The computer program product of claim 15, further comprising program instructions executable by the processor of the system to cause the system to identify the trusted contacts of the users based on social media accounts associated with the user.

19. The computer program product of claim 15, wherein the one or more trusted contacts of the user are manually added by the user.

20. The computer program product of claim 15, further comprising program instructions executable by the processor of the system to cause the system to obtain real-time location information of the user, and update the user delivery profile of the user using the real-time location information of the user.

* * * * *